United States Patent [19]

Bata et al.

[11] 4,147,205

[45] Apr. 3, 1979

[54] VACUUM ACTUATED AUTOMATIC TEMPERATURE CONTROL SYSTEM WITH ACTUATOR PRESSURE SIGNAL FEEDBACK

[75] Inventors: George T. Bata, Grafgon; Van P. Spiker, Newport News, both of Va.

[73] Assignee: The Bendix Corporation, Southfield, Mich.

[21] Appl. No.: 832,142

[22] Filed: Sep. 12, 1977

[51] Int. Cl.² .......................... F25B 29/00; B60H 3/00
[52] U.S. Cl. ........................................ 165/26; 165/43; 236/84
[58] Field of Search ...................... 165/26, 42; 236/84, 236/87; 91/365

[56] References Cited

U.S. PATENT DOCUMENTS

| 3,059,663 | 10/1962 | Whitenack | 236/84 |
| 4,063,682 | 12/1977 | Orcutt | 236/87 |

Primary Examiner—William L. Freeh
Attorney, Agent, or Firm—Gaylord P. Haas, Jr.; Russel C. Wells

[57] ABSTRACT

An automatic control system for regulating the temperature of the passenger compartment in automotive vehicles is disclosed of the type in which a vacuum operated actuator is utilized to control the position of a blend air door, the position of the blend air door in turn controlling the temperature of the air circulated into the passenger compartment by proportioning the flow of cooled air circulated through a heater prior to entering the passenger compartment. This air flow is utilized to correct the temperature level in the passenger compartment. The disclosed control system features a nulling pressure signal feedback loop in which the error signal developed by the difference in the temperature selector and sensor signals acts on a vacuum modulator to generate an actuator pressure level which is sensed and a corresponding electrical signal used to null the temperature error signal, to provide a stabilizing feedback loop in the control system. A particular vacuum modulator structure is also disclosed in which a pair of heated bimetal actuator devices are utilized to control communication of a vent port and a source of vacuum pressure with an interior chamber, the resulting pressure communicated to the vacuum operated actuator. The heater circuit for the heated bimetals is controlled to develop the proper actuator pressure and also features an interrupted heater current mode of operation in which the heater current is interrupted after a predetermined deflection of the heated bimetals to thereby improve their response and to simplify the design thereof.

10 Claims, 4 Drawing Figures

VACUUM ACTUATED AUTOMATIC TEMPERATURE CONTROL SYSTEM WITH ACTUATOR PRESSURE SIGNAL FEEDBACK

BACKGROUND OF THE INVENTION

1. Field of the Invention.

This invention relates to automatic temperature control systems for controlling the temperature within an enclosure and more particularly such control systems of the type used to automatically control the temperature within the passenger compartment of automotive vehicles.

2. Description of the Prior Art.

Automatic temperature control systems for automotive vehicles commonly utilize a control scheme in which air is circulated through a ducting system by a blower, and first cooled by passing the air through an evaporator coil of an air conditioner, the air then being circulated to a diverter box in which the cooled air is proportioned between a bypass duct passage into the interior of the passenger compartment and a heater passage in which is located the heater core. The relative proportion of air moved through the bypass or heater duct passages thus controlling the temperature of the air circulated into the passenger compartment.

This proportioning is controlled by means of a blend air door which is pivotally mounted to divert a portion of the cool air to one or the other of the bypass or heater duct passages. The position of the blend air door in turn is controlled by means of a vacuum operated actuator which causes the blend air door to assume various positions in correspondence with the level of vacuum pressure existing within the vacuum operated actuator.

The pressure level is determined by the temperature controls of the system acting on a vacuum modulator device which modulates vacuum pressure in correspondence with a temperature error signal, i.e., the difference between a manually selected temperature level and the sensed temperature level. This correspondence is such that with the increasing magnitude of the error signal, a correspondingly great change in vacuum pressure is produced to divert a relatively greater proportion of air in either the bypass of the heater duct. The sense of the error signal controls the sense of the pressure change and the direction of movement of the blend air door.

For example, if the temperature in the passenger compartment is greater than that selected, the vacuum modulator device is adjusted to cause the blend air door to divert a greater proportion of the cooled air into the diverter box bypass duct. Similarly, if the temperature level in the engine compartment falls below the selected level, the vacuum modulator pressure is varied by the system controls to cause the vacuum operated actuator to move the blend air door to a position in which a greater proportion of air is diverted past the heater core. Since the error signal relied on for automatic control of the position of the blend air door is basically a thermal signal, i.e., the difference between the selected and sensed temperature levels, the system must be stabilized due to the time lags inherent in a temperature control system. Particularly is this so in these systems in which the change in position of the blend air door lags considerably the change in temperature of the passenger compartment.

Commonly, such systems are stabilized by the use of a force balancing system such as a diaphragm in which a temperature error responsive control member acts against the forces generated by the pressure developed in the vacuum modulator. A typical example of such a system is disclosed in the Amano et al U.S. Pat. No. 3,877,638 in which a heated bimetal element is moved in response to the generation of an error signal. The force balancing of the heated bimetal against the diaphragm subjected to the regulated vacuum rapidly stabilizes the system.

A substantial drawback to these systems results from the absence of control by the difference between the sensed and selected temperature levels, and the use of the force balance stabilization in the vacuum modulator. This drawback is in the considerable variations in the actual temperature achieved by the system controls for a given selected temperature level with variations in various system and external conditions such as ambient air, pressure and temperature engine vacuum levels, etc.

It thus has been heretofore proposed to stabilize the control system by utilizing a position feedback potentiometer directly associated with the blend air door, which feedback signal is used to null the temperature error signal. It has been discovered that this approach improves the system's response in that the stabilization to the error signal is more quickly achieved, but more importantly, it has been discovered that the correspondence between the selected temperature level and the temperature level actually maintained in the passenger compartment must more closely correspond to each other.

Such a system is disclosed in the Weaver et al U.S. Pat. No. RE 27,699 which discloses a position feedback potentiometer driven by mechanical movement of the door actuator for the blend air door.

While such arrangements have been successful, space limitations sometimes preclude the installation of such feedback potentiometers and other devices, and further increase the mechanical complexity of the system.

Another disadvantage of the force balance systems of Amano et al is that the pressure changes including the demands of the actuator cannot be met with the full application of the vacuum sources, since only a metering communication between the source and the vacuum regulator is provided in that system.

This is contrasted with the approach of the Weaver et al patent in which full communication of the source is created until the correct position of the actuator is achieved. Obviously, the response of the system will be faster with the approach of the Weaver et al patent.

It is, therefore, an object of the present invention to provide an improved automatic temperature control system of the type described in which a control system stabilizing feedback signal is provided in which the temperature level achieved by the control system is in close correspondence with the selected level.

It is yet another object of the present invention to provide such an automatic temperature control system in which such stabilizing feedback signal is provided which does not involve a force balancing system with the temperature controlled output member.

It is still another object of the present invention to provide such automatic temperature control system in which the feedback signal does not require a mechanical connection with the blend air door or actuator movable members.

It is yet another object of the present invention to provide feedback signals by relatively simple reliable means for achieving the rapid response and constant temperature control desirable in such control systems.

Another object of the present invention is to provide such system in which the advantages of full source communication with the actuator are also obtained.

SUMMARY OF THE INVENTION

These and other objects, which will become apparent upon a reading of the following specification and claims, are achieved by automatic temperature control systems in a pressure sensor sensing the actuator pressure levels produced by the vacuum modulator and generating corresponding electrical signals to the sensed pressure. These signals are utilized as a stabilizing feedback signal which nulls a temperature error signal used to control the pressure transducer to produce the modulated vacuum pressure causing the vacuum operated blend air door actuator to assume the appropriate position in correspondence to the sense and magnitude of the error signal. The pressure transducer used as the vacuum modulator incorporates a heated bimetal actuator device arranged to intermittently create full communication of an interior chamber with a vent or vacuum source depending on the sense of the temperature error signal to produce a corresponding variable fluid pressure within the vacuum modulator interior chamber which pressure is communicated to the actuator device and which also senses the pressure sensor to generate the pressure feedback. The pressure feedback signal is summed with the manual temperature sensor signal and a passenger compartment temperature sensor signal to control the heated bimetal actuator to achieve the proper pressure level for a given error signal. The blower speed is also varied in correspondence with the magnitude of the error signal.

DETAILED DESCRIPTION

In the following specification, a particular embodiment will be described in accordance with the requirements of 35 USC 112 and specific terminology utilized in the interest of clarity. However, it is to be understood that the same is intended to be merely illustrative and is not intended to be limiting inasmuch as the invention is capable of taking many forms and variations within the scope of the appended claims.

Figure 1:
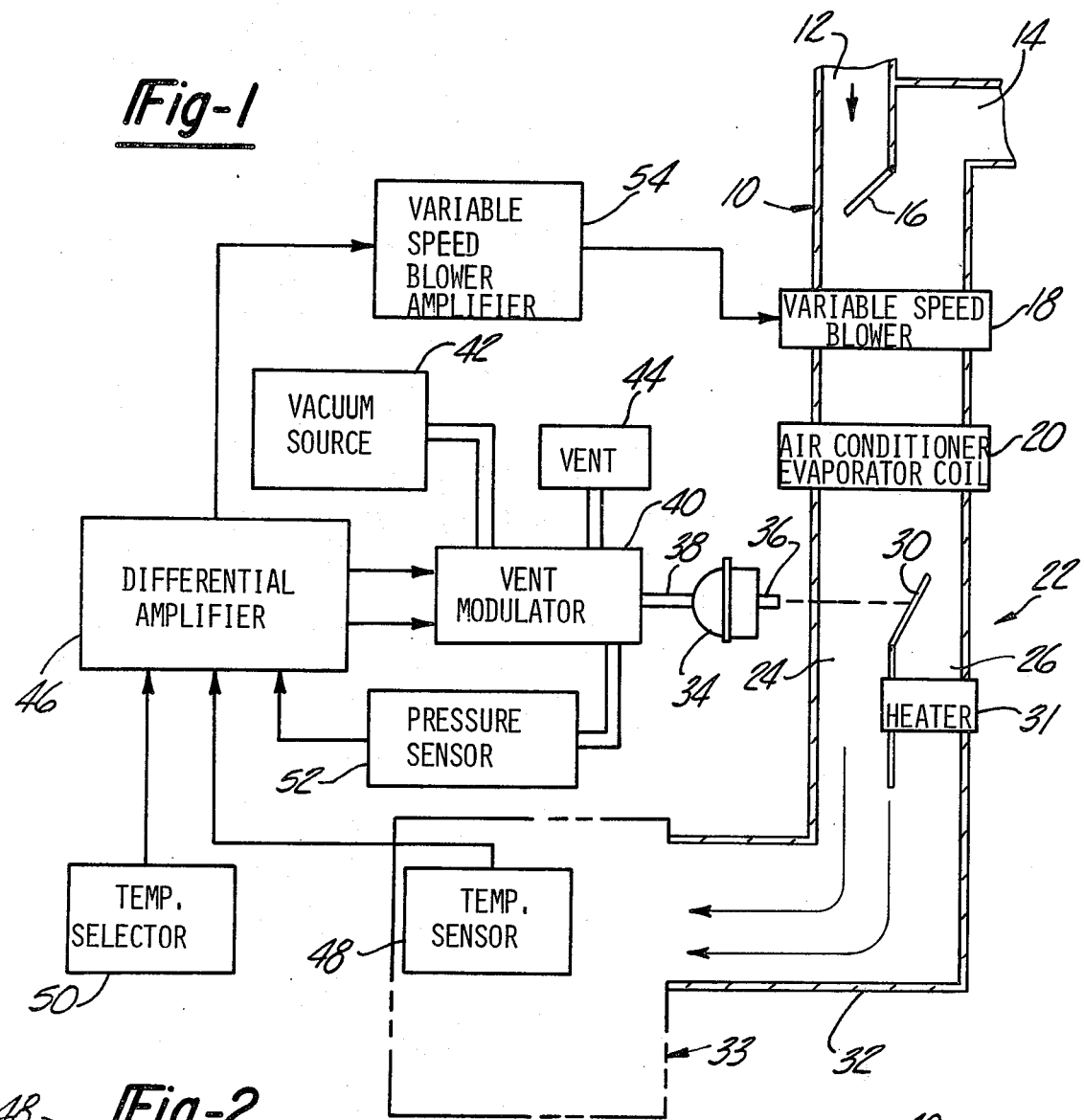
FIG. 1 is a diagrammatic representation of an automatic temperature control system according to the present invention.

Referring to the drawings and particularly FIG. 1, the system according to the present invention has been developed for application to the above described automatic temperature control system for passenger compartments of automotive vehicles. As noted, such systems typically comprise a ducting system 10 for drawing in a mixture of outside air and compartment air through respective duct passages 12 and 14. Typically, a damper 16 is provided to control the proportion of outside and inside air drawn into the system depending on the conditions of operation. For example, during cold engine start-up or when the passenger compartment has become overheated during warm weather, maximum application of the heater or air conditioner, respectively, dictates that compartment air be circulated through the ducting 10 in order to speed the heating or cooling of the passenger compartment to more comfortable levels.

The air is circulated by means of a blower 18 which is of variable speed type controlled by the system controls to adapt the air flow to varying system requirements in accordance with control features of the system to be described.

The air flow is directed through the ducting system 10 through the air conditioner evaporator coils 20, located within a section of the ducting 10 and which receives the liquified refrigerant from the air conditioning system so as to cool the coils and thereby the air circulated flowing within the ducting 10 through the air conditioner evaporator coils 20.

After being cooled, the air flow is directed to a diverter box portion 22 of the ducting 10, comprised of a pair of duct passages, a bypass duct 24 and a heater duct 26 created by a partition 28. The mass air flow is proportioned between the bypass duct 24 and the heater duct 26 by means of a movable blend air door 30 which can be positioned so as to proportion the air flow either all through the ducting past the duct 24 or all through the heater duct 26, or any proportion therebetween.

The heater core 31 is mounted in the heater duct 26 and acts to heat the blend air door controls the temperature of the air downstream of the diverter box 22 in the lower ducting 32 which communicates with the passenger compartment 33. The cooled air passing out of the air conditioner evaporator 20 is not heated and is thus at a minimum temperature when the blend air door 30 is in the position divering maximum flow to the bypass duct 24. In the opposite direction, when maximum flow is diverted to the heater duct 26, the temperature of the air in the downstream ducting 32 is at a maximum temperature.

The position of the blend air door 30 is determined by the position of a vacuum operated actuator 34 which has an output member 36 mechanically linked to the blend air door 30. The vacuum operated actuator 34 is of the type responsive to modulated vacuum pressure in a line 38 to vary the position of the output member 36 in correspondence with the pressure level in line 38. The pressure level in line 38 in turn is controlled by a vacuum modulator 40 which controls the communication of an interior chamber connected to line 38 with a source of vacuum pressure, such as the engine intake manifold and a vent passage 44 in communication with atmospheric pressure to create a pressure in line 38 which varies below atmospheric, so as to position the vacuum operated actuator 34 and output member 36.

The communication of the vacuum source 42 and vent 44 with the interior of the vacuum modulator 40 in turn is controlled by control signals received from a differential amplifier 46 which receives electrical signals from a temperature sensor 48, a manual temperature selector 50 and a pressure sensor 52 which senses the pressure produced within the vacuum modulator 40 by the communication with the vacuum source 42 and the vent 44. The passenger compartment temperature sensor 48 is placed to sense the actual temperature of the interior of the passenger compartment at an appropriate point within the passenger compartment which is in the dash controls of the temperature control system. This generates an electrical signal corresponding to this temperature.

Manual temperature selector 50 is that part of the temperature controls in which the desired temperature level may be manually set by the user and may take the form of a rheostat or other equivalent device so as to generate an electrical signal corresponding to the desired temperature.

The pressure sensor 52 similarly is responsive to the pressure level existing in the vacuum modulator 40 which in turn corresponds to the pressure level in the passage 38 and generates electrical control signals corresponding thereto.

Each of these elements may be of conventional design and many suitable devices are available to satisfactorily produce the corresponding electrical signals and accordingly the details of the same are not here included.

The temperature signals are compared and amplified within the differential amplifier 46 to produce a temperature error signal which causes either the vacuum source 42 or the vent 44 to be placed in communication with the interior vacuum modulator 40 so as to vary the pressure in accordance with the sense of the error signal so as to cause the vacuum operated actuator 34 to be operated to position the blend air door 30 in a position corresponding to an appropriate change in the temperature of the air passing into the ducting 32 in order to promptly produce the temperature correction. The signals generated by the temperature sensor 48, the manual temperature selector 50 and the pressure sensor 52 are appropriately related such that for each temperature error signal produced by a difference in the selected temperature and the sensed temperature, there is a corresponding position of the air blend door 30, which position in turn corresponds to a modulated vacuum pressure within the passage 38 sensed by the pressure sensor 52. The corresponding pressure signal value is appropriately subtracted from the temperature error signal by the differential amplifier 54 to null the error signal upon achievement of this pressure value. This efficiently provides a second feedback loop from the thermal loop.

Thus, the temperature error signal causes an appropriate control of the vacuum modulator 40 to either increase or decrease the pressure within the vacuum modulator 40.

Once this pressure has been achieved, the temperature error signal corresponding to the difference between the selected temperature and the sensor compartment temperature is nulled by the feedback of the pressure signal generated by change in vacuum pressure within the vacuum modulator.

Thus, the blend air door 30 will assume a diverting position proportioned to the magnitude of the temperature error signal in a direction such as to tend to reduce the error signal, i.e., to a relatively great proportion of flow of cooled air into either the bypass or heater duct to cool or heat the passenger compartment to reduce or increase the passenger compartment temperature. As the temperature changes, the temperature error signal likewise reduces and the blend air door accordingly will typically assume several positions as the temperature is brought to the manually selected temperature level.

It will be appreciated that the response of the control system is rapid and becomes stabilized quickly since the temperature error is nulled by the feedback of the pressure signal within the vacuum modulator which is developed much more rapidly than the change in compartment temperature with changes in position of the blend air door 30. Indeed the control system according to the present invention should be more responsive than the blend air door potentiometer, since the first condition to change in response to an error signal is the modulated vacuum pressure.

The blower 18 may be continuously varied in correspondence with the modulated vacuum pressure by means of a continuously variable blower amplifier 54 responsive to the amplified pressure sensor signal to control the blower 18 so as to continuously vary its speed and hence the air flow in the ducting 10 to increase the capacity of heating or cooling in either extreme position of the blend air door 30. The blower speed is at a maximum and is reduced as the blend air door 30 reaches its median position at which neither temperature increases or decreases are called for by the output signal of the differential amplifier 46.

Figure 2:
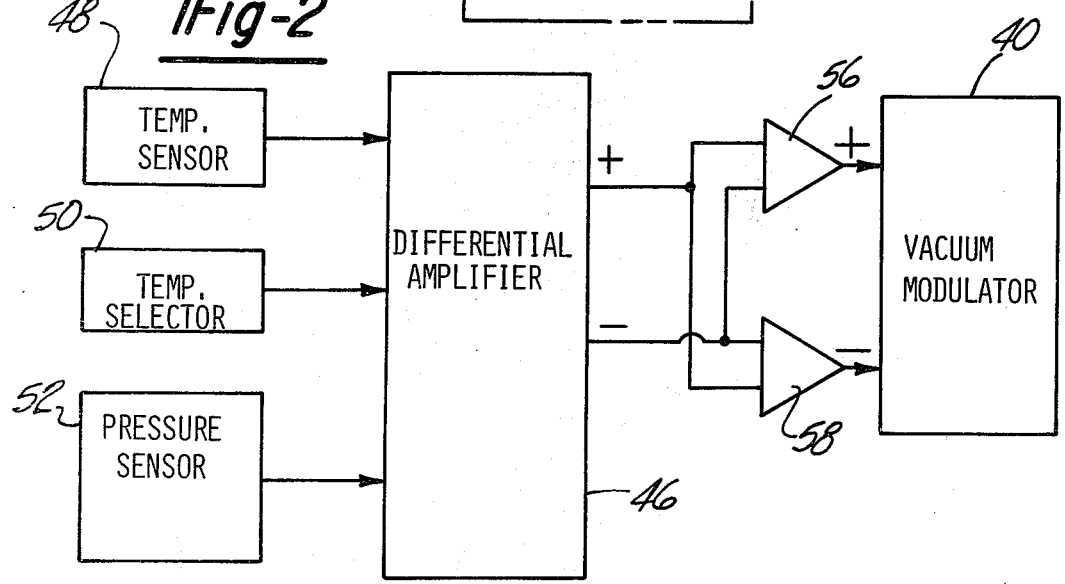
FIG. 2 is a block diagram of the control system pressure transducer components relating to the vacuum modulator device used in the automatic control system shown in FIG. 1 showing a control signal sense catch arrangement.

As can be appreciated from the above description, the error signals produced will either be in one or another of two senses, i.e., either calling for an increase or a decrease in the passenger compartment temperature level. As shown in FIG. 2, these error signals may be latched by means of a pair of comparators 56 and 58 which are connected to the output of the differential amplifier 46, such that the vacuum modulator control can receive only an error signal of one or the other sense by means of a cross connection between the input signals to insure that the vacuum modulator cannot receive both error signals during transient conditions in the system.

Figure 3:
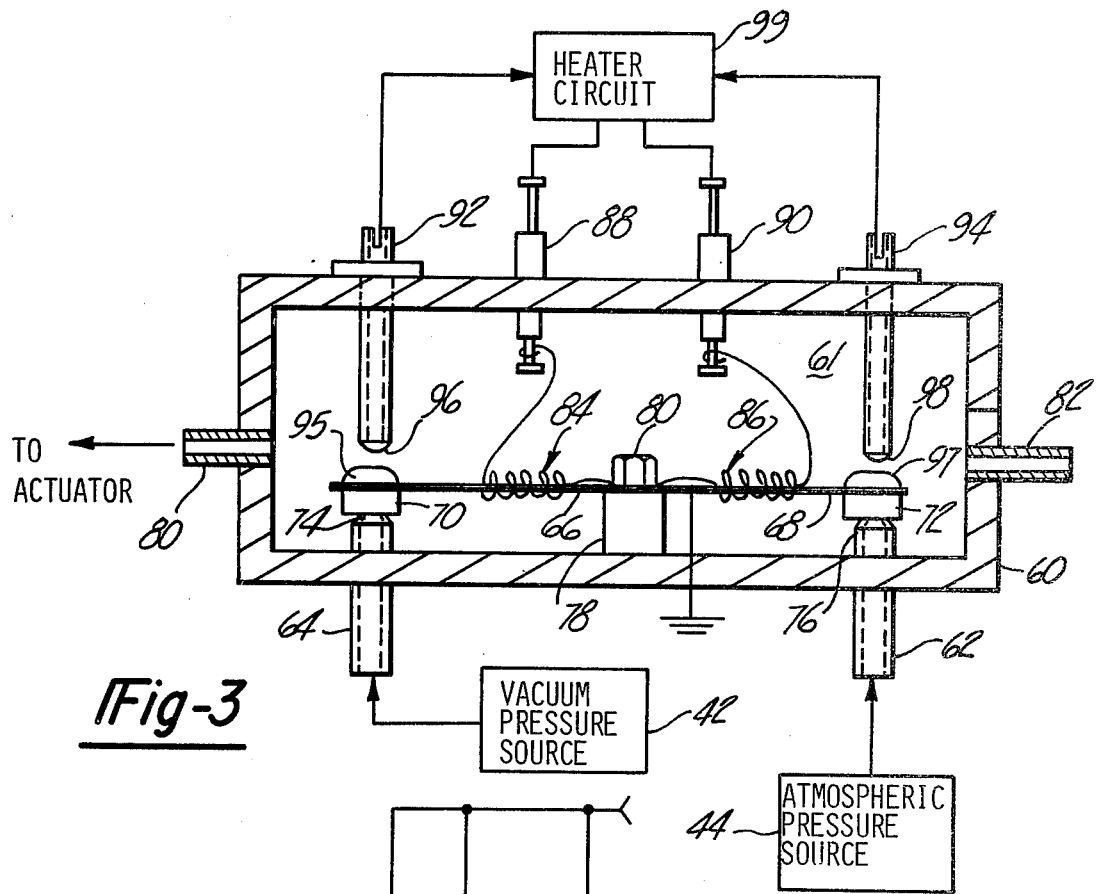
FIG. 3 is a partial sectional view of the vacuum modulator device utilized in the system shown in FIG. 1 together with a block diagram representation of the associated controls.

An appropriate and advantageous pressure transducer design suitable for use as the vacuum modulator 40 is the subject of co-pending application Ser. No. 833,407, filed Sept. 15, 1977. This transducer incorporates a heated bimetal actuator device which is shown in FIG. 3. The pressure transducer includes a sealed enclosure or housing 60 which has a pair of inlet ports 62 and 64. Inlet port 64 is connected to the vacuum source 42 and port 62 being connected to the vent 44. A pair of bimetal arms 66 and 68 (which may be formed from a single strip) are equipped with a pair of sealing valve seats 70 and 72, respectively, which are adaptive to be biased against the terminus 74 or 76 of the port 62 and 64 exiting within the interior chamber 61 of the sealed enclosure 60 so as to control the communication of the ports 62 and 64 as well as the connected vacuum and vent sources 42 and 44, with the interior chamber 61 of the sealed enclosure 60. The bimetal arms 66 and 68 are designed so as to be biased into the seating position shown in FIG. 3 throughout and well above the range of ambient temperatures to be encountered in normal service. The bimetal arms 66 and 68 are mounted to the pedestal 78 by means of a screw 80 threadedly engaging the pedestal 78 so as to cantilever each of the bimetal arms 66 and 68 as shown.

The pressure developed within the sealed enclosure 60 is communicated to the vacuum operated actuator device via an outlet port 80 while the pressure sensor 52 may be connected to the interior chamber 61 by means of a gage sensor port 82 at the opposite end of the housing as shown. The pressure within the interior chamber 61 can be varied to either be increased or decreased by a controlled interval of full communication of either the port 62 or 64 with the interior chamber 61 by unseating of the seat 70 or 72 caused by upward movement of the bimetal arms 66 or 68, respectively, which in turn would increase or decrease the pressure existing within the passages in communication therewith and the vacuum operated actuator 34 in raising of either of the bimetal arms 66 or 68 and is created by heating of the bimetal elements 66 or 68 by current flowing in a heater winding 84 or 86.

Heater windings 84 and 86 are energized by the error signals produced in the differential amplifier 46 in either sense requiring either a change in position of the vacuum operated actuator 34 in a direction corresponding to either raising or lowering of the pressure produced in the interior chamber 61 and the connected passages. The heater windings 84 and 86 may be grounded as shown to the pedestal 78 whereas the positive voltage side of the circuit is applied to the connections of the heater terminals 88 and 90, respectively.

The movement of either the bimetal arms 66 or 68 produces an engagement of an interrupter contact 95 or 97 which causes an interruption of the heating circuit 99 associated with heater windings 84 and 86. This controls the heating of the bimetal arms 66 or 68 such that the slight cooling of either the bimetal arms 66 or 68 allows either of these to again be lowered and allowing the heater circuits to again be energized such that the movement of the bimetal arms 66 and 68 when actuated may consist of slight oscillating movements into and out of contact with the interrupter terminals 96 and 98 while allowing the continued communication of the respective port 74 or 76 with the interior chamber 61. The advantage of the interrupted mode of operation is that the heating of the bimetal can be more accurately controlled and its response may be much more rapid since large heating currents can be utilized without danger of overheating of the bimetal upon continued application of the heating currents as is described in more detail in the above-mentioned co-pending patent application.

It should be noted that if the null conditions have been met by the initial opening of either port 74 or 76, the bimetal arms 66 or 68 will not of course be cycled in this manner.

Figure 4:
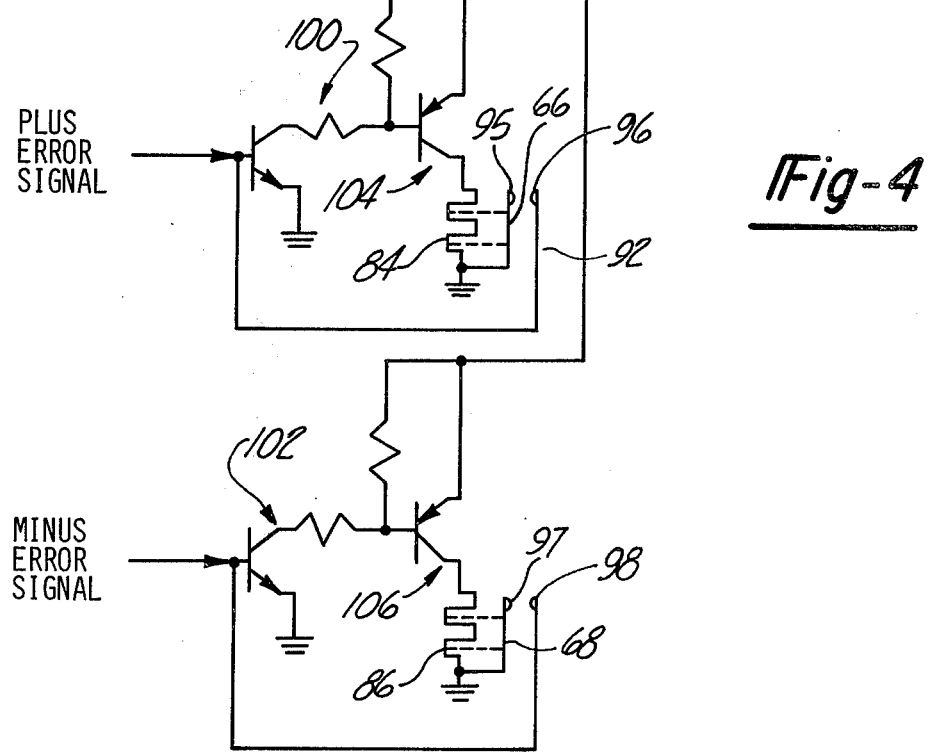
FIG. 4 is a schematic representation of the heater control circuitry asociated with the bimetal actuator devices forming a part of the vacuum modulator shown in FIG. 3.

Referring to FIG. 4, a heater circuit schematic diagram is depicted showing a suitable arrangement for interrupting of the heat circuit during contact with the interrupter terminals 96 and 98. As seen in FIG. 4, the error signals received from the differential amplifier are applied to the base of a pair of transistors 100 and 102, respectively, with each of the emitters connected to ground and the collectors connected to a second pair of transistors 104 and 106, respectively. In the presence of an error signal at the base of either transistor 100 or 102, current flows from the applied voltage line 80 through the transistors 104 and 106 and through either the heater winding 84 or 86 to ground to thereby heat either the bimetal arm 66 or 68. Upon contact between the contacts 95 with the interrupter terminals 96 or 98, caused by a movement of the bimetal arms 66 or 68, the base of the transistor 100 or 102 is connected to ground which in turn turns off the transistors 104 or 106 causing the heater current to be interrupted. As noted, this allows the bimetal arms 66 or 68 to cool slightly, disengaging the interrupter contact and re-establishing the heater current in the event of a continued presence of an error signal. This allows relatively high heater current flow without the danger of overheating of the bimetal arms 66 and 68 as is more fully disclosed in the above-referenced co-pending patent application.

Accordingly, it is seen that the above-disclosed system affords the advantages of the design approach of the system described in the aforementioned Weaver et al patent in which a dual feedback path is provided, i.e., thermal and actuator position. In the present case, these advantages are provided by the use of pressure signal feedback while not necessitating the use of a position potentiometer on a mechanical actuator device or on the blend air door itself. This has been accomplished without the addition of complex control components and in a manner compatible with existing control system designs.

It should be understood that the control concept is to be incorporated in automatic temperature control systems having conventional control features not disclosed herein such as the high-low level ducting, cold engine lock out features, system control over the air conditioner and heater outputs, and variations of inside and outside air inducted into the ducting. Since such features do not comprise the present invention, the details of the same are not included, reference being made to the Weaver et al patent for a detailed disclosure of many of these items.

Similarly, the components of the system, such as the temperature sensor, the manual temperature selector device, the vacuum operated actuator and pressure sensor, are all currently available devices well known to those of ordinary skill in the art. Suitable such components are disclosed in the Weaver et al patent and since the details of the same do not comprise the present invention, they are not here described.

While a particular embodiment has been described in accordance with the requirements of 35 USC 112, it is of course understood that the invention is capable of taking many forms and variations within the scope of the present invention, for example, the particular vacuum modulator described herein, while offering particular advantage in this context, other suitable devices may be used as, for example, the device shown in the Weaver et al patent.

The embodiments of the invention in which an exclusive property or privilege is claimed are defined as follows:

1. An automatic temperature control system for producing a selected temperature in an enclosed space, said system comprising:
   selector means for generating a signal corresponding to a selected temperature level;
   temperature sensor means for sensing the temperature level within said enclosed space and generating a corresponding signal;
   means for generating an error signal corresponding to the difference between said selector means signals and said temperature sensor signals;
   means for increasing or decreasing the temperature level in said enclosed space in response to generation of said error signal;
   said last named means including an actuator device having a movable output member which causes an increase or decrease in the temperature level of said enclosed space upon assuming a corresponding position;

said last named means further includes means causing said movable member to assume a corresponding position in response to generation of said error signal, including pressure transducer means, said pressure transducer means generating a variable fluid pressure in correspondence with said error signal;

said actuator means being responsive to the level of pressure generated by said pressure transducer means to assume said corresponding position of said movable member;

pressure sensor means generating a signal corresponding to said pressure level and means responsive to said pressure sensor means to null said error signal means by said pressure signal upon generation of said pressure sensor signal corresponding to the development of said variable pressure corresponding to the corresponding position of said movable member to said error signal;

whereby said pressure sensor means signal forms a feedback control loop in said automatic temperature control system.

2. The automatic temperature control system according to claim 1 wherein said pressure transducer means producing variable pressure comprises vacuum modulator means, including means for providing intermittent communication of said vacuum modulator with a source of vacuum pressure and further including means for intermittently communicating said vacuum modulator valve with an atmospheric vent, means controlling said intermittent communication of said vacuum source and vent source in correspondence with said error signal to produce a modulated vacuum pressure corresponding to said error signal and wherein said pressure sensor means senses said modulated vacuum pressure.

3. The automatic temperature control system according to claim 2 wherein said actuator means comprises a vacuum operated actuator and wherein said movable member assumes a position corresponding to a variable level of pressure below atmospheric pressure.

4. The automatic temperature control system according to claim 2 wherein said temperature selector means, said temperature sensor and said pressure sensor means generate electrical signals respectively corresponding to said selected temperature, said sensed temperatures and said vacuum pressure levels.

5. The automatic temperature control system according to claim 4 wherein said means generating said error signal includes a differential amplifier.

6. The automatic temperature control system according to claim 4 wherein said vacuum modulator valve includes a pair of heated bimetal arms and means for creating said intermittent communication of said vacuum source and said vent source corresponding to movement of a respective one of said bimetal arms, further including a heater circuit and means producing a heating current in a respective heater circuit corresponding to said error signal in either sense of said sensed temperature difference.

7. The automatic temperature control system according to claim 6 wherein said pressure sensor signals discontinue said heating current in said respective heater circuit upon achievement of a pressure level in said vacuum modulator corresponding to said corresponding position of said actuator movable member.

8. The automatic temperature control system according to claim 7 wherein said vacuum modulator valve further includes contacts in position with respect to each of said heated bimetal arms and further includes means interrupting said heater circuit upon movement of each of said bimetal arms so as to create communication of either said vacuum source or said vent source with said vacuum modulator whereby further heating of said bimetal elements is interrupted.

9. A control system for an automotive passenger compartment air temperature control system, said system including:

a ducting system in communication with said passenger compartment and further including means for causing air flow into said ducting system and into said passenger compartment;

means in said ducting system for cooling said air moving through said ducting system;

a diverter box located in said ducting system downstream of said cooling means, said diverter box comprising means for proportioning said air flow between a bypass duct and a heating duct, said heating duct including means for heating the proportion of air flow diverted therethrough;

a blend air door located in said diverter box, movably positioned to vary the proportion of said air flow directed into said bypass duct and said heating duct, whereby the temperature of the air circulated into said passenger compartment may be varied in accordance with the position of said blend air door;

said control system further including a vacuum operated actuator movably positioning said blend air door;

said vacuum operated actuator in turn operated by means of a modulated vacuum pressure in communication with said vacuum operated actuator;

manual temperature selector means producing an electrical signal corresponding to a selected passenger compartment temperature level;

compartment temperature sensor means sensing the temperature level in said passenger compartment and producing a corresponding electrical signal;

said vacuum modulator means responsive to the difference between said manual selector signal and said temperature selector signal to change the pressure produced by said vacuum modulator to change the position of said blend air door so as to correct the difference between said selected temperature and said sensed temperature level;

the improvement comprising:

pressure sensor means generating an electrical signal corresponding to the pressure generated by said vacuum modulator and further including means for nulling said error signal upon generation of a pressure signal corresponding to the vacuum operated actuator member position utilized to eliminate said temperature differential.

10. The control system according to claim 9 wherein said means for causing air flow in said ducting system includes an electrical blower and further including means continuously varying the speed of said blower responsive to variations in said pressure sensor signal.

* * * * *